No Printed Specification Available
198X
T. BRUFF.
Coffee Mill.
Patented Jan. 8, 1798.
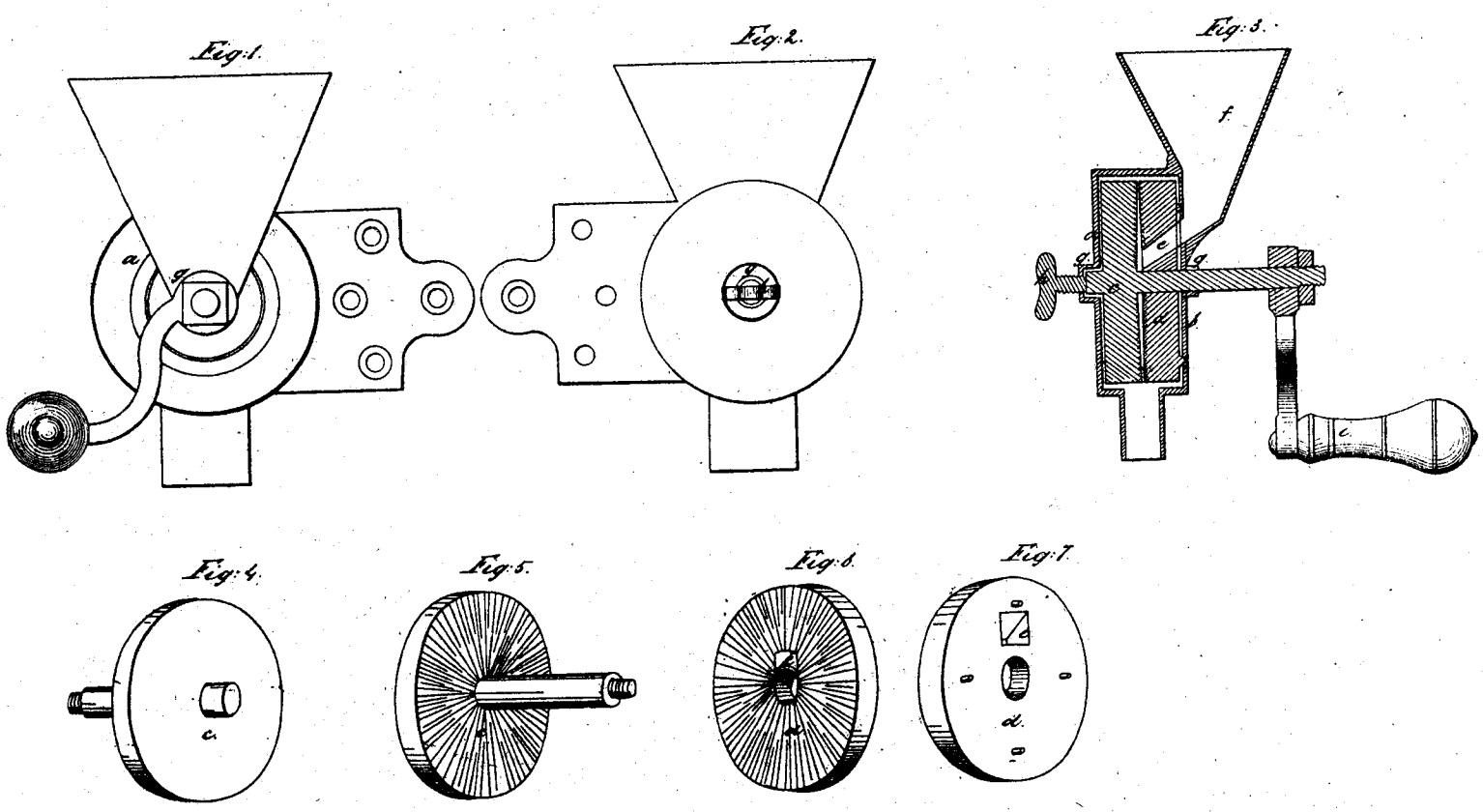

UNITED STATES PATENT OFFICE
PTO – BOYERS, PA DUTY STATION

---

PAGE NOT AVAILABLE

PATENT NUMBER X198 FOR THE ISSUE DATE 1/1/8/1798 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL TEXT

DATA CONVERSION OPERATION
BOYERS, PA